United States Patent [19]

Sutton

[11] Patent Number: 5,090,334
[45] Date of Patent: Feb. 25, 1992

[54] METHOD AND APPARATUS FOR MANUFACTURING LAP DESKS

[76] Inventor: Lloyd M. Sutton, 4804 Eldorado, Wichita Falls, Tex. 76310

[21] Appl. No.: 553,358

[22] Filed: Nov. 14, 1990

Related U.S. Application Data

[63] Continuation of Ser. No. 14,792, Feb. 13, 1987, abandoned.

[51] Int. Cl.$^5$ .............................................. A47B 23/00
[52] U.S. Cl. .................................. 108/43; 264/216
[58] Field of Search .................. 108/43; 297/DIG. 1, 297/456; 248/444

[56] References Cited

U.S. PATENT DOCUMENTS

| | | | |
|---|---|---|---|
| 2,705,522 | 1/1955 | Kamborian | 154/41 |
| 2,955,972 | 10/1960 | Wintermute et al. | 154/110 |
| 3,146,143 | 8/1964 | Bolesky et al. | 156/212 |
| 3,318,636 | 5/1967 | Callum | 297/457 |
| 3,407,757 | 10/1968 | Warner | 108/43 |
| 3,661,684 | 5/1972 | Rallis et al. | 156/583 |
| 4,035,458 | 7/1977 | Lyman | 297/DIG. 1 X |
| 4,052,944 | 10/1977 | Jennings | 108/43 |
| 4,099,278 | 7/1978 | Parisi | 297/DIG. 1 X |
| 4,114,213 | 9/1978 | Beernaerts et al. | 5/345 |
| 4,229,847 | 10/1980 | Degen | 297/DIG. 1 X |
| 4,537,646 | 8/1985 | Hoyle | 156/212 |
| 4,547,920 | 10/1985 | Hulsebusch et al. | 297/DIG. 1 X |
| 4,700,634 | 10/1987 | Mills et al. | 108/43 |

Primary Examiner—Jose V. Chen
Attorney, Agent, or Firm—Richards, Medlock & Andrews

[57] ABSTRACT

A lap desk includes a top member and a subplanar element having a port through which a granular material may pass and air passages formed along its perimeter. A flexible casing is attached to the subplanar element and the casing has a border covering the air passages. A flowable granular material is located within the flexible casing and the flexible casing is attached to the perimeter of the subplanar element and the top member is attached to the fabric border of the flexible casing and the subplanar element.

15 Claims, 3 Drawing Sheets

METHOD AND APPARATUS FOR MANUFACTURING LAP DESKS

This application is a continuation of application Ser. No. 014,792, filed Feb. 13, 1987, now abandoned.

TECHNICAL FIELD

The present invention relates to lap desks and more particularly to such desks designed to facilitate the manufacture thereof.

BACKGROUND ART

Portable lap desks having a pillow-like portion of flexible material filled with a dry flowable material secured to a hard planar writing surface are well known in the art. These portable lap desks provide a light weight portable desk surface, which may be used almost anywhere, on almost any surface, which desk is durable and relatively inexpensive to manufacture. Examples of these portable lap desks and methods for their manufacture are described in U.S. Pat. No. 4,052,944 entitled "Portable Shuffle Desk."

It is well known in the art to manufacture portable lap desks by cementing a flexible pillow-like casing to the perimeter of a rigid sheet material known as the subplanar, which subplanar has a port through which a flowable granular material may be inserted into the flexible pillow-like casing. In particular, the method of the prior art provides that the flowable granular material is inserted into the flexible pillow-like casing by hand, which method is a time consuming and inefficient operation.

Generally, the subplanar member has door-like portions or elements to close the port through which the granular material is inserted. The rigid planar writing surface is attached to the pillow-like structure by the hand application of cement to the subplanar element and to the overlapping edges of the pillow-like portion to assure that the pillow is attached to the rigid planar member about its entire perimeter.

The method of the prior art suffers numerous disadvantages, such as the difficulties experienced in locating the subplanar member with respect to the flexible pillow casing to assure that the flowable granular material is easily inserted into the interior of the casing, while simultaneously assuring that a uniform and proper amount of excess fabric is available from the border of the pillow to permit the fabric to overlap the subplanar and be cemented to the exterior planar surface.

Further, the method of the prior art suffers the disadvantage of requiring a workman to load the pillow-like casing with a flowable granular material by hand, which operation is time consuming and inefficient as well as wasteful of the granular material. In particular, when the granular material is expanded polystyrene beads, the workman experiences great difficulty in placing the material within the pillow-like structure without excessive spillage and other losses of the material. Generally, shops which employ this hand loading method are subject to the persistent problem of excess granular material being present on the shop floors, requiring the additional labor expense of removing the waste granular material from the shop.

Further, the method of the prior art provides no means by which the peripheral pillow material may be easily retained on the surface of the subplanar elements while cement is applied to the fabric for attachment to the exterior planar surface.

Consequently, a need exists in the art for a means for easily locating the subplanar element relative to the pillow-like casing to allow easy insertion of the flowable granular material into the pillow, and for a means of placing the flowable granular material within the pillow casing in a quick and efficient manner without the risk of spilling any of the material. Further, a need exists in the art for retaining the fabric perimeter of the pillow-like casing on the surface of the subplanar element so that the fabric may overlap the subplanar element and allow efficient application of cement to ensure that the fabric is adequately secured to the surface of the rigid planar writing surface.

SUMMARY OF THE INVENTION

The present invention contemplates an apparatus for manufacturing a lap desk comprising a vacuum mold having an air passage means in its interior surface and connected to a vacuum source, whereby air is drawn through the air passage means to said vacuum source. The vacuum mold is sized to receive a pillow-like casing, and retains the casing in a secure position while allowing air to pass through the casing to the vacuum source. A storage means retains a flowable material, and a delivery means transports the flowable material from the storage means to the interior of the pillow-like casing located in the vacuum mold.

Further, the present invention provides a method of producing lap desks, comprising the steps of locating a pillow-like casing element in a vacuum mold having an upper edge and drawing the casing to the sides of the mold by the use of a vacuum; locating a subplanar element on the casing in the vacuum mold to form a volume between the casing element and subplanar element; filling the volume with a flowable granular material; folding the excess casing material fabric to overlap the perimeter of the subplanar element; applying glue to the overlapping fabric and subplanar element to allow a portion of the glue to pass through the overlapping fabric by the action of the vacuum while the remaining glue stays on the overlapping fabric; attaching a rigid planar element to the casing fabric by the glue means; and removing the lap desk construction from the vacuum mold.

And yet further, the present invention provides a vacuum mold to receive the pillow-like casing elements, wherein the vacuum mold may be of rectangular configuration and have a plurality of air passage means, or holes located about its entire surface to assure that the pillow-like casing is drawn to contact the entire inner surface of the vacuum mold by the force of air passing through the air passage means. The present invention provides in an alternative embodiment, a vacuum mold made of a flexible web or netting to receive the pillow-like casing element, and allow the pillow-like casing element to expand to its maximum volume within the confines of the web so as to better receive and retain the flowable material. In another aspect, the flexible web vacuum mold contemplated by the present invention has an enlarged air passage means so as to more efficiently cause the pillow-like casing element to be drawn into the full volume of the web by air passing therethrough, and to more efficiently receive and retain the flowable material by the natural movement of air through the air passage means. Further, the present invention contemplates a flexible web vacuum mold wherein the webbing is of adjustable length to permit the volume of the flexible web to be either increased or decreased depending upon the degree to which the pillow-like casing element is desired to be filled with the flowable material.

In accordance with a further aspect of the present invention, an improved lap desk, comprising a rigid planar member, a subplanar element having a port through which a granular material may pass and a plurality of holes located about its perimeter sized to allow the passage of air therethrough, and a pillow-like casing sized to engage the subplanar element is provided, where said casing has a fabric border of sufficient width to overlap and cover the air holes located about the perimeter of the subplanar element. A flowable granular material is located within said pillow-like casing so as to substantially fill the casing, and the pillow-like casing is attached to the perimeter of the subplanar element. A rigid planar writing surface is attached to both the fabric border of the pillow-like casing and the subplanar element.

BRIEF DESCRIPTION OF THE DRAWINGS

A more complete understanding of the invention and its advantages will be had from the Detailed Description taken in conjunction with the accompanying Drawings, in which.

DETAILED DESCRIPTION

Figure 1:
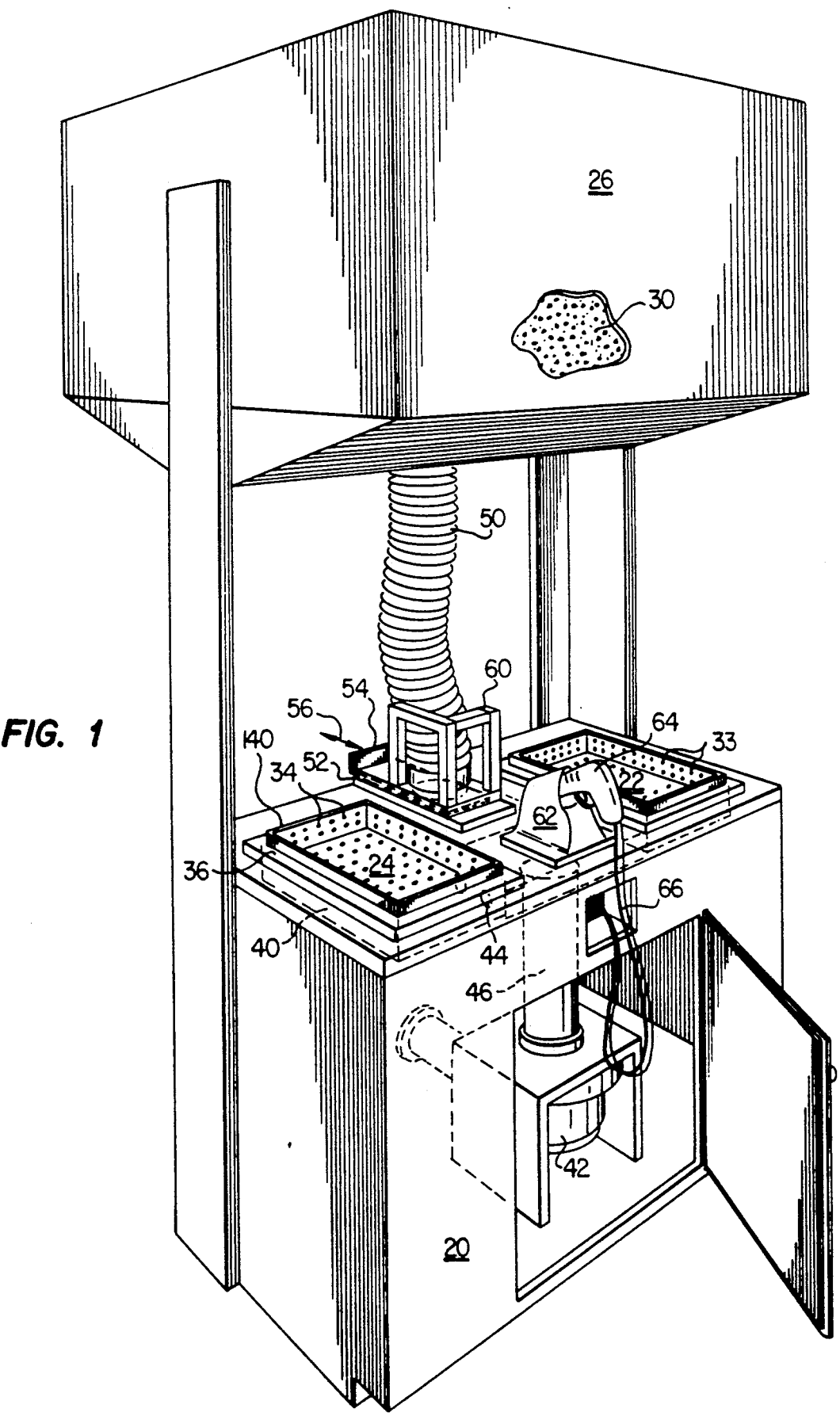
FIG. 1 is a perspective view of the apparatus of the present invention.

Referring to FIG. 9, the apparatus of the present invention comprises a cabinet 20 which has dual vacuum molds 22 and 24 and a hopper 26 for retaining a flowable material 30. In particular, vacuum molds 22 and 24 have interior surfaces that have holes 33 and 34, respectively, which holes allow the passage of air from the interior of the vacuum molds to vacuum manifolds, where vacuum mold 24 extends beneath surface 36 into vacuum manifold 40 which is connected to vacuum pump 42 by ducts 44 and 46. Similarly, vacuum mold 22 extends into a vacuum manifold which is connected to vacuum pump 42 by ducts (not shown). Vacuum pump 42 is user controlled by an on/off switch (not shown).

A flexible tube 50 is connected to the bottom of hopper 26 and is of sufficient diameter to allow the passage of flowable material 30 therethrough by the force of gravity. At the end of tube 50 most distant from hopper 26 is valve structure 52, having gate 54 to control the flow of material 30 through tube 50. Gate 54 is slidably engaged with valve structure 52 to move as indicated by arrow 56, and serves to control the flow of material 30 from hopper 26. Valve structure 52 has handle 60 which is sized to be grasped by the human hand and allow the operator to lift valve structure 52 and the end of tube 50 from surface 36 to positions located over vacuum molds 22 or 24. As shown in FIG. 1, hopper 26 is located above cabinet 20 so that flowable material 30 may pass through tube 50 under the influence of gravity. It will be further understood that the present invention also contemplates hopper 26 located at the same level as is cabinet 20, where flow of material 30 may be fed into tube 50, or its equivalent, by means of a conveyor belt (not shown), by an air blower (not shown), or by any other suitable means.

Also located on surface 36 is holder 62 adapted to receive electric glue gun 64 containing a heat setting glue, and powered by an electric cable 66. Cable 66 is of sufficient length to allow glue gun 64 to reach the entire respective perimeters of vacuum molds 22 and 24. Electric cable 66 is connected to an outside power source (not shown).

Figure 2:
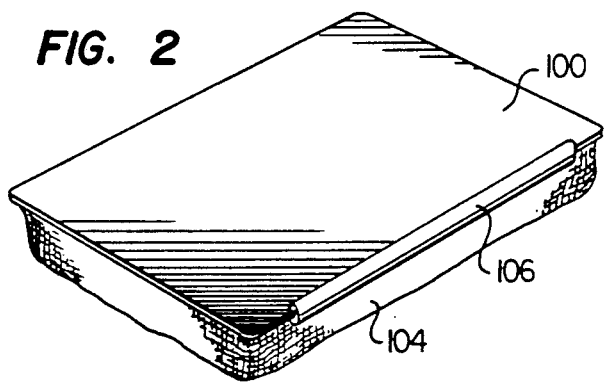
FIG. 2 is an exploded view of the article produced by the method of the present invention.
Figure 3:
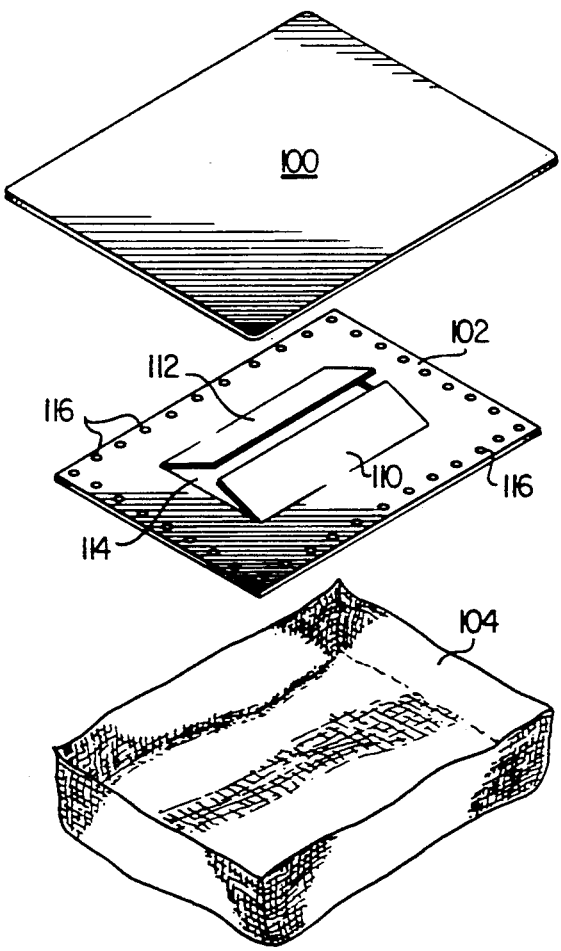
FIG. 3 is an exploded view of the article produced by the method of the present invention.

Referring now to FIGS. 2 and 3, the lap desk produced by the method of the present invention is shown, being comprised of a rigid planar element 100, a flexible pillow-like casing 104, a subplanar element 102 and a longitudinal stop 106. In particular, subplanar element 102 has doors 110 and 112 located proximate port 114, and a plurality of holes 116 located about its perimeter. It will be understood that the article produced by the method of the present invention also contains a sufficient amount of flowable material 30 to fill the volume of the pillow-like casing to the desired degree.

Figure 4A:
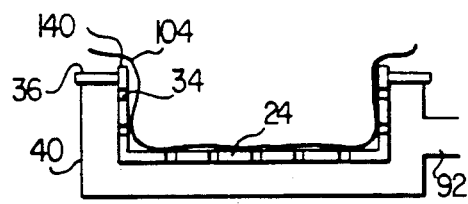
FIG. 4a is a cross-sectional view of one step of the method of the present invention.

Referring to FIG. 4a, according to the method of the present invention, casing 104 is placed in vacuum mold 24. It will be understood that vacuum mold 24 is of sufficient depth to receive casing 104 while simultaneously allowing the peripheral edge, or border, of the casing to extend from the mold. As shown, holes 34 allow air located within vacuum mold 24 to pass into vacuum manifold 40 to exit the manifold through duct 44.

Figure 4B:
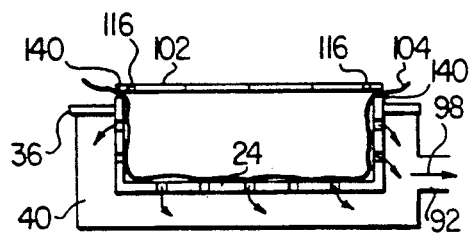
FIG. 4b is a cross-sectional view of one step of the method of the present invention.

As shown in FIG. 4b, when vacuum pump 42 is operated, air is drawn through holes 34, as shown by arrows 96, drawing casing 104 to the interior surface of vacuum mold 24, and retaining casing 104 in this position while simultaneously allowing the border of the casing to extend from the vacuum mold. At this point, the border of the casing may be folded over the peripheral edge 140 of vacuum mold 24. Air drawn through holes 34 into vacuum manifold 40 exits the manifold through duct 44, as indicated by arrow 98. In alternative embodiments, vacuum molds 22 and 24 may have any suitable air passage means such as slits, slots, or meshes, for example, to allow casing 104 to be drawn and secured to the interior surfaces of the vacuum molds.

While casing 104 is pressed against the interior surface of vacuum mold 24, and the border of the casing is extended over peripheral edge 140, subplanar element 102 is positioned over the vacuum mold so that its peripheral edge rests on peripheral edge 140 of vacuum mold 24, with the border of casing 104 located between peripheral edge 140 and the subplanar element.

Figure 4C:
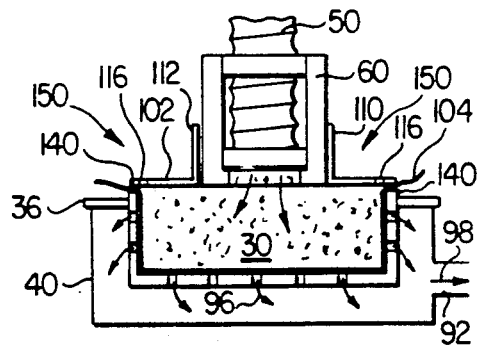
FIG. 4c is a cross-sectional view of one step of the method of the present invention.

Referring now to FIG. 4c, with subplanar element 102 secured to peripheral edge 140 by vacuum pressure, doors 110 and 112 are opened so that valve structure 52 may be placed between the open doors and gate 54 is opened to allow flowable material 30 to pass through port 114 to fill the volume between casing 104 and subplanar element 102. In particular, flowable material 30 travels down tube 50 from hopper 26 under the force of gravity and tends to fill the volume between the casing and subplanar element by the force of the air moving through holes 34, as shown by arrows 96. When the volume between the casing and subplanar element is substantially filled with flowable material, gate 54 is closed and valve structure 52 is removed from the space between doors 110 and 112. Doors 110 and 112 are then closed. Generally, it will be understood that flowable material 30 is drawn into the volume between casing 104 and subplanar element 102 by the vacuum drawn through holes 34 in mold 24, for example, and is secured in casing 104 by air passing through the casing and into manifold 40, for example. Further, in alternative embodiments, port 114 need not have doors 110 and 112, but may have a single door, or no door at all. It will be further understood that because of the natural flow of air through port 114, any flowable material 30 which may be displaced from gate 50 onto the surface of subplanar element 102 is drawn back towards port 114 by the natural flow of air, thus avoiding any spillage or other losses of flowable material 30 during the filling operation.

Figure 4D:
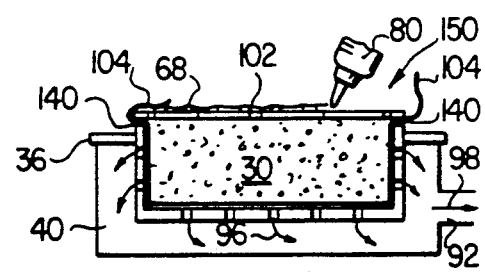
FIG. 4d is a cross-sectional view of various steps of the method of the present invention.
Figure 4E:
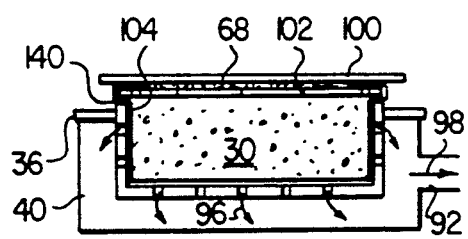
FIG. 4e is a cross-sectional view of one step of the method of the present invention.

As shown in FIG. 4d, air is drawn through holes 116 as shown by arrow 150. When doors 110 and 112 are closed, the excess border of casing 104 is folded over onto the peripheral edge of subplanar element 102 and the force of air passing through holes 116 retains the border material of casing 104 in a position overlapping subplanar element 102. Glue 68 is applied to the exterior surface of casing 104, and directly to subplanar element 102. As shown in FIG. 4e, rigid planar element 100 is pressed against the glue-coated surface of subplanar element 102 and the glue-coated surface of the peripheral material of casing 104 to be secured thereto.

Further, glue 68 is placed on the exterior surface of the peripheral material of casing 104, and in particular, glue 68 is placed over holes 116, so that glue 68 is partially drawn through the fabric by vacuum action to contact the periphery of subplanar element 102, while the remainder of glue 68 remains on the outer surface of the peripheral material of casing 104 where originally applied. Thus, glue 68 serves to form an integral bond between rigid planar element 100, casing 104, and subplanar element 102. It is the use of a vacuum that "clamps" all of the elements together to allow glue 68 to be efficiently and properly applied thereto. When glue 68 is sufficiently set, the completed article is removed from vacuum mold 24.

It will be understood that glue 68 preferably should be in a liquid or semiliquid state prior to solidification, so that it may be partially drawn through the fabric periphery of casing 104 to contact the periphery of subplanar element 102. As described, glue 68 is a heat setting glue, but in alternative embodiments glue 68 may be any water based glue, may be based upon any other solvent, may be a liquid or semiliquid epoxy formulation, or may be any other suitable glue. It will be further understood, however, that in alternative embodiments, attachment means other than glue may be employed to assemble the casing, subplanar and rigid planar elements, such as, for example, pressure or heat sensitive tape.

The present invention also contemplates the alternative method of applying glue 68 t subplanar element 102, wherein glue 68 is directly applied to subplanar element 102 before the border material of casing 104 is folded over onto the peripheral edge of the subplanar elements, and subsequently, glue 68 is applied to the exterior surface of casing 104, and directly to the subplanar element.

Figure 5:
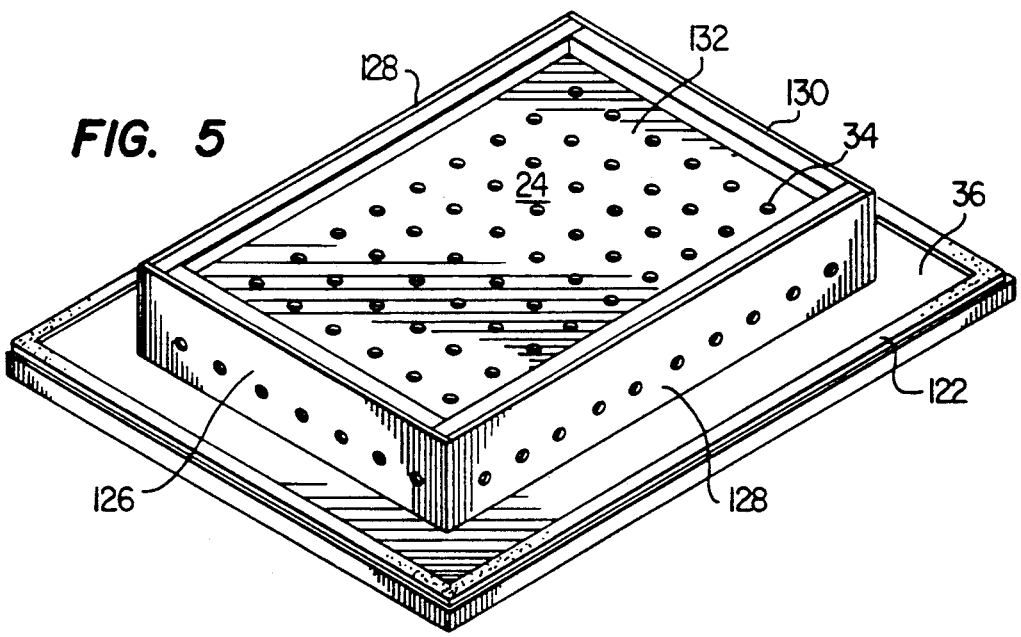
FIG. 5 is a perspective view of the vacuum mold element of the present invention.

Referring to FIG. 5, vacuum mold 24 and surface 36 are removable from vacuum mold 40 and cabinet 20. As shown in FIG. 5, vacuum mold 24 and surface 36 are shown in an inverted position, where vacuum mold 24 comprises sides 124, 126, 128, and 130, and bottom run 132. Holes 34 are seen in vacuum mold 24's sides and bottom, and holes 34 serve as an air passage means, allowing air to pass from the interior of vacuum mold 24 (not shown) through the four sides and bottom, and into vacuum manifold 40, as shwon in FIG. 1. Surface 36 contacts vacuum mold 24 at each of its four sides and has air seal 122 located about its periphery and sized so as to engage with cabinet 20 when vacuum mold and surface 36 are located in vacuum manifold 40, as shown in FIG. 1. Air seal 122 is made from rubber or any other suitable material to assure that air does not pass between cabinet 20 and surface 36, thus protecting the integrity of vacuum manifold 40, and assuring that the air within vacuum mold 24 passes into vacuum manifold 40 only through holes 34.

Figure 6:
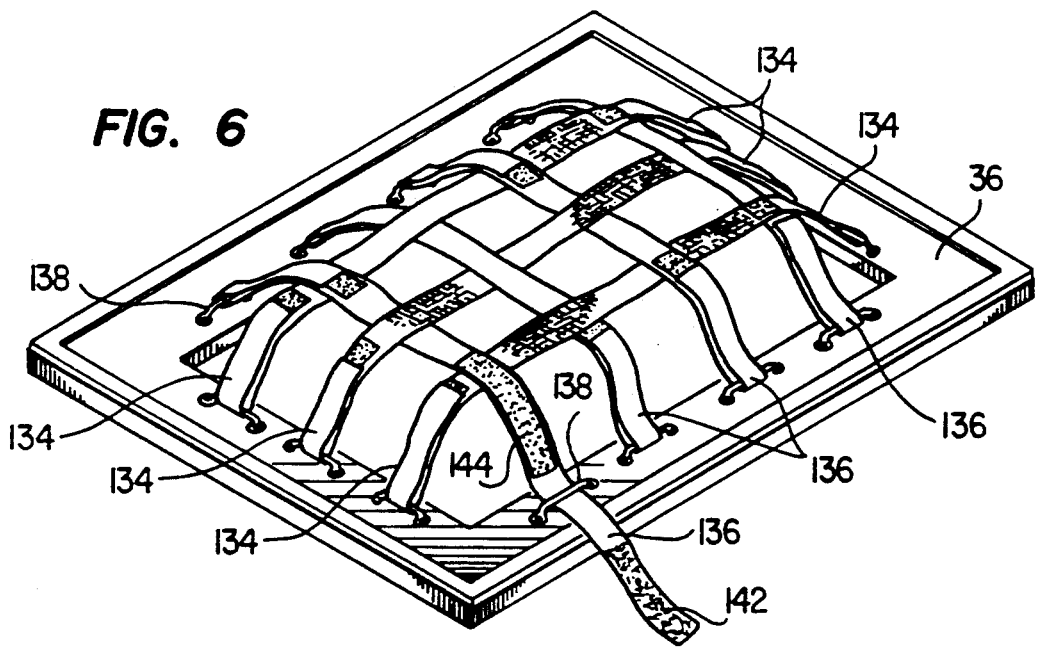
FIG. 6 is a perspective view of an alternative embodiment of the vacuum mold element of the present invention.

Referring to FIG. 6, in an alternative embodiment, surface 36 has mounted on it a web, so that the web will project into vacuum manifold 40 when surface 36 is located on cabinet 20 as shown in FIG. 1. In particular, the web contemplated by the present invention comprises a plurality of flexible bands, where bands 134 cross bands 136 in a perpendicular fashion. As shown in FIG. 6, bands 134 and 136 pass through cleats 138 and are secured to cleats 138 by doubling over each respective end of bands 134 and 130 to engage loop 142 and hook 144 material. Loop 142 and hook 144 material is more commonly known by the tradename Velcro ®. It will be understood that each of the bands will be attached at either end to cleats 138, and that by adjustment of the velcro ® attachments at either end of each band the length between cleats 138 may be either increased or decreased. It will be understood that by either increasing or decreasing the respective lengths of bands 134 and bands 136 the amount by which this web protrudes into vacuum manifold 40 may be either increased or decreased, respectively. The web shown in FIG. 6 serves as a vacuum mold to receive and retain pillow-like casing 104 and its corresponding flowable material 30 during the above described assembly steps, and the web can be adjusted between assemblies to receive and retain pillow-like casings of either greater or smaller volume to produce lap desks having variable sized pillow-like portions.

The method and apparatus of the present invention satisfy a need in the art for a means for easily locating a subplanar element relative to a pillow-like casing to allow easy insertion of a flowable granular material into the pillow, and the need for a means and method of placing the flowable granular material within the pillow casing in a quick and efficient manner without the risk of spilling any of the material.

Further, the method and apparatus of the present invention satisfy the need in the art for retaining the fabric perimeter of a pillow-like casing on the surface of a subplanar element so that the fabric may overlap the subplanar element and allow efficient application of cement to assure that the fabric is adequately secured to the surface of the rigid planar writing surface, and to assure that the fabric and the rigid planar writing surface are adequately secured to the subplanar element.

The method and apparatus of the present invention provide the novel concept of using a vacuum to facilitate the insertion of a flowable granular material into a pillow casing, and to "clamp" the perimeter of the pillow-like casing to a subplanar element to allow the proper application of a cement thereto, and the vacuum also causes the cement to partially migrate from the exterior surface of the fabric perimeter to contact the subplanar element, thus resulting in an integral attachment of the rigid planar element to the pillow-like casing's perimeter and to the subplanar element. The resulting lap desks produced by the method and apparatus of the present invention are of superior construction because of the integral attachment of the rigid planar elements, pillow-like casing, and subplanar elements.

Although preferred embodiments of the invention have been described in the foregoing Detailed Description and illustrated in the accompanying Drawings, it will be understood that the invention is not limited to the embodiments disclosed, but is capable of numerous rearrangements, modifications, and substitution of parts and elements without departing from the spirit of the invention. The present invention is therefore intended to encompass such rearrangements, modifications, and substitution of parts and elements as fall within the scope of the invention.

I claim:

1. A lap desk comprising:
   a rigid planar member;
   a subplanar element having a port through which a granular material may pass, and air passages located about its perimeter;
   a pillow-like casing sized to engage said subplanar element, said casing having a fabric border which is attached to the perimeter of said subplanar element and contacts and covers said air passages located about the perimeter of said subplanar element; and
   a flowable granular material located within said pillow-like casing so as to substantially fill said casing.
   means for attaching said pillow-like casing to the perimeter of said subplanar element without said granular material being positioned between said border and said subplanar element and for attaching said rigid planar element to said fabric border of the pillow-like casing and said subplanar element.

2. The lap desk of claim 1, wherein said air passages comprises a plurality of holes located about the perimeter of the subplanar element.

3. The lap desk of claim 1 wherein said rigid planar member, pillow-like casing, and subplanar element are attached with glue.

4. The lap desk of claim 1 wherein said rigid planar member, pillow-like casing, and subplanar element are attached by pressure sensitive tape.

5. The lap desk of claim 1 wherein said rigid planar member, pillow-like casing and subplanar element are attached by heat sensitive tape.

6. A lap desk comprising:
   a top member;
   a subplanar element having a port through which a granular material may pass and air passages formed along its perimeter;
   a flexible casing for attachment to said subplanar element, said casing having a border which is attached to the perimeter of said subplanar element and contacts and covers said air passages, and
   a flowable granular material located within said flexible casing, wherein said flexible casing is attached to the perimeter of said subplanar element, and said top member is attached to said fabric border of said flexible casing and said subplanar element.

7. The lap desk of claim 6 wherein said air passage means comprises a plurality of apertures through said subplanar member.

8. The lap desk of claim 6 wherein said top member, flexible casing, and subplanar element are attached with glue.

9. The lap desk of claim 6 wherein said top member, flexible casing, and subplanar element are attached by pressure sensitive tape.

10. The lap desk of claim 6 wherein said top member is a rigid planar sheet.

11. A lap desk comprising:
    a top member;
    a subplanar element having air passages formed therethrough;
    a flexible casing for attachment to said subplanar element, said casing having a border which is attached to the perimeter of said subplanar element and contacts and covers said air passages; and
    a flowable granular material positioned within said flexible casing, said flexible casing being attached to said subplanar element overlying said air passages, said top member being attached to said fabric border of the flexible casing or the subplanar element and overlying said air passages.

12. The lap desk of claim 11 wherein said air passage means comprises a plurality of apertures through said subplanar member.

13. The lap desk of claim 11 wherein said top member, flexible casing, and subplanar element are attached with glue.

14. The lap desk of claim 11 wherein said top member, flexible casing, and subplanar element are attached by pressure sensitive tape.

15. The lap desk of claim 11 wherein said top member is a rigid planar sheet.

* * * * *